United States Patent [19]

Tait

[11] Patent Number: 4,598,276

[45] Date of Patent: Jul. 1, 1986

[54] DISTRIBUTED CAPACITANCE LC RESONANT CIRCUIT

[75] Inventor: William C. Tait, Oak Park Heights, Minn.

[73] Assignee: Minnesota Mining and Manufacturing Company, St. Paul, Minn.

[21] Appl. No.: 667,607

[22] Filed: Nov. 6, 1984

Related U.S. Application Data

[63] Continuation-in-part of Ser. No. 552,305, Nov. 16, 1983.

[51] Int. Cl.[4] .............................................. G08B 13/24
[52] U.S. Cl. .................................... 340/572; 336/200; 333/167; 333/175; 333/185; 333/219; 340/552; 343/895
[58] Field of Search ...................... 340/572, 552, 553; 336/200; 343/895; 333/184–185, 138–140, 167–169, 174, 175, 177, 219

[56] References Cited

U.S. PATENT DOCUMENTS

| | | | |
|---|---|---|---|
| 2,584,592 | 2/1952 | Kehbel | 336/200 |
| 2,911,605 | 11/1959 | Wales, Jr. | 336/200 |
| 3,413,716 | 12/1968 | Schwertz et al. | 336/200 |
| 3,436,687 | 4/1969 | Andrews, Jr. et al. | 336/200 |
| 3,810,147 | 5/1974 | Lichtblau | 340/280 |
| 3,863,244 | 1/1975 | Lichtblau | 340/280 |
| 3,913,219 | 10/1975 | Lichtblau | 29/592 |
| 3,967,161 | 6/1976 | Lichtblau | 317/101 R |
| 4,021,705 | 5/1977 | Lichtblau | 361/402 |
| 4,322,698 | 3/1982 | Takahashi et al. | 333/184 |
| 4,369,557 | 1/1983 | Vandebult | 340/572 |
| 4,555,291 | 11/1985 | Tait et al. | 333/185 |

FOREIGN PATENT DOCUMENTS

WO83/01697  5/1983  PCT Int'l Appl. .

Primary Examiner—Glen R. Swann, III
Attorney, Agent, or Firm—Donald M. Sell; James A. Smith; William B. Barte

[57] ABSTRACT

An electronic article surveillance system and a marker for use therein, which marker comprises a tuned resonant circuit including inductive and capacitive components formed of a laminate of a dielectric and conductive-multi-turn spirals on opposing surfaces of the dielectric, wherein the capacitive component is formed as a result of distributed capacitance between the opposed spirals, and wherein the circuit thereby resonates at at least two predetermined frequencies which are subsequently received to create an output signal.

2 Claims, 13 Drawing Figures

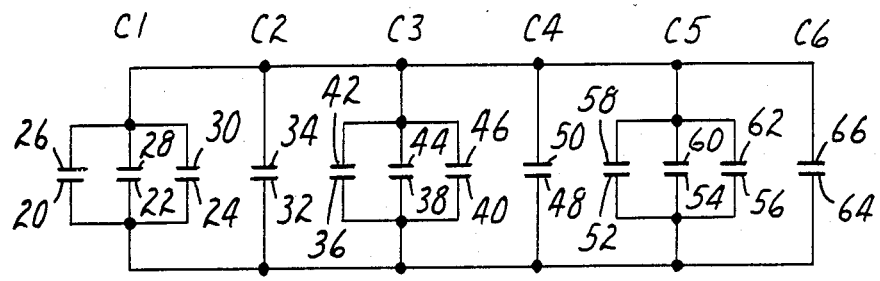
FIG. 3
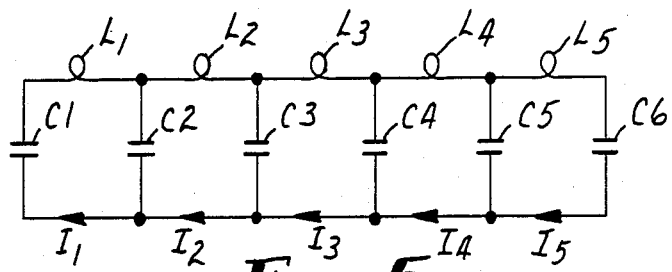
FIG. 5
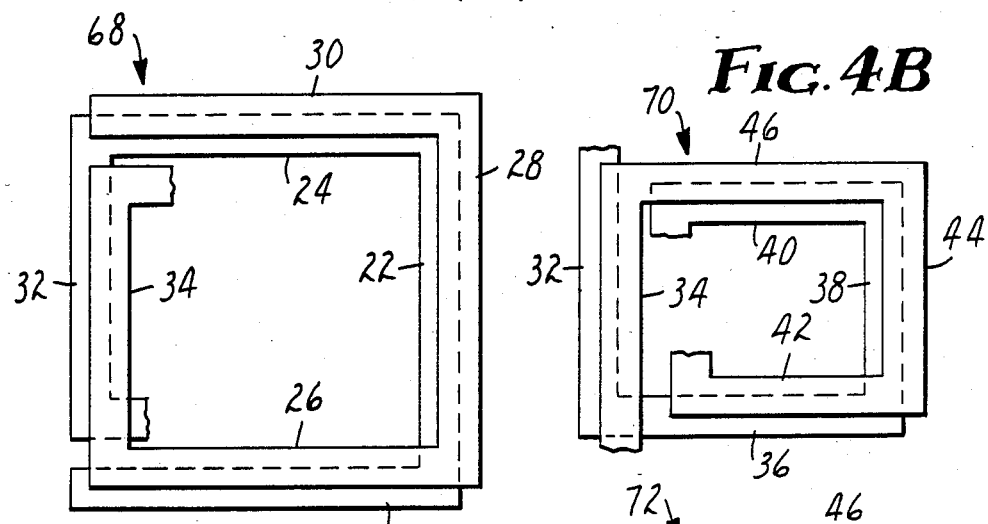
FIG. 4A
FIG. 4B
FIG. 4C

DISTRIBUTED CAPACITANCE LC RESONANT CIRCUIT

CROSS-REFERENCE TO A RELATED APPLICATION

This application is a continuation-in-part of co-pending application Ser. No. 552,305, filed Nov. 16, 1983.

FIELD OF THE INVENTION

This invention relates to tuned resonant electrical circuits including an inductive and capacitive component, such as are useful as a marker in electronic article surveillance systems, and in particular, to such circuits in which the inductor is a flat conductive spiral such as formed of metal foil or conductive paint applied to a dielectric sheet, and the capacitor is formed by the same sheet in combination with conductive areas on opposing surfaces thereof.

DESCRIPTION OF THE PRIOR ART

Numerous configurations of resonant tag or marker circuits have been previously disclosed. For example, in U.S. Pat. No. 3,810,147 (Lichtblau) such a circuit is shown to include a dielectric sheet having an inductive spiral positioned on one side thereof, such as an appropriately configured metal foil, which is terminated at each end by first and second conductive areas. Matching conductive areas are provided on the opposite side of the dielectric sheet, which areas combine with the sandwiched sheet to form two capacitors, thus completing an inductive-capacitive tuned resonant circuit. Similar circuits are further depicted in subsequent patents of Lichtblau (U.S. Pat. Nos. 3,863,244; 3,913,219; 3,967,161 and 4,021,705), such patents further disclosing the formation of a direct electrical connection between conductive areas on both sides of a dielectric sheet, such as via a pin, eyelet or weld formed by melting directly through the dielectric Another modification of such a resonant circuit is depicted in U.S. Pat. No. 4,369,557 (Vandebult), FIGS. 5-8 of which depict constructions in which the need for an electrical connection through a dielectric sheet is obviated by a technique in which two inductive spiral patterns and electrical connections therebetween are provided on the same side of a dielectric sheet, and the sheet is thereafter folded over such that appropriate conductive areas become opposed to each other to form matching capacitor plates with a portion of the dielectric sheet sandwiched therebetween. In FIGS. 6 and 7 thereof, the dielectric sheets are depicted to have on one surface an inductive pattern having first and second portions electrically connecting two conductive areas. The sheets are then to be folded over to align the conductive areas, such an embodiment being desired as a larger number of inductor windings can be provided for a given tag size. In the embodiment there depicted, the two inductor portions are configured such that when the sheet is folded over to form a capacitor by the alignment of the conductive areas, and the resultant circuit is energized, current flowing in all inductor windings will flow in the same direction. That patent further teaches the desirability of intentionally misaligning the coil windings on the folded-over opposing faces to reduce capacitive coupling between the windings.

SUMMARY OF THE INVENTION

The present invention is also a tuned resonant circuit and comprises a dielectric sheet having on each surface thereof a conductive multi-turn spiral, each turn of which forms a substantially closed loop. However, in the circuits of the present invention, no discrete opposing conductive areas are provided on opposite surfaces of the sheet to form capacitor plates. Rather, each leg of each spiral is in substantial registry with an opposing leg of the spiral on the opposite surface, and each of the spirals is oppositely wound with respect to each other when both are viewed from the same side of the sheet, i.e., one spirals inwardly in a clockwise direction and the other in a counterclockwise direction. Current inductively coupled into the spirals thus flows in the same direction in each spiral. At least one predetermined portion of each spiral is in direct electrical contact with an opposing portion of the opposite spiral. Such a construction results in a series of closed loops having both inductive and distributed capacitive components which in combination resonate at one predetermined fundamental frequency and a plurality of higher order frequencies. By connecting predetermined portions of the opposing spirals together, it has been found that the effective capacitance is increased over that resulting if the respective inductors are but capacitively coupled, such that the resonant frequency of the circuit is correspondingly decreased, while the inductance of each loop is not appreciably changed. Similarly, current inductively coupled into the connected spirals is altered by the contact, the extent of such changes depending upon which portions of the spirals are connected. Unlike prior circuits in which distributed capacitance effects are deleterious and must be minimized, in the present invention, distributed capacitances are advantageously used to reduce eddy currents, thus obtaining a high Q-factor and desirable signal emitting characteristics.

Another embodiment of the present invention pertains to an electronic article surveillance system which utilizes the resonance of such a distributed capacitance circuit at a plurality of frequencies. Such a system comprises a transmitter for transmitting radio frequency energy at at least two of the frequencies at which the circuit resonants, a marker containing such a distributed capacitance circuit, and a receiver for receiving signals resulting from the resonance of the circuit at the two frequencies and for creating an output signal in response to the receipt of the resultant signals.

BRIEF DESCRIPTION OF THE DRAWINGS

FIG. 3 is an equivalent electrical circuit illustrative of the distributed capacitors resulting from the respective opposing portions of the spirals shown in FIG. 2;

FIGS. 4A, 4B and 4C are broken-away top views of successive turns of the spirals shown in FIG. 2, each turn of which may be viewed as a separate inductive loop;

FIG. 5 is a complete equivalent electrical circuit corresponding to the embodiment shown in FIG. 2, setting forth the functional interconnections between the distributed capacitors as shown in FIG. 3 and the respective inductive components as shown in FIGS. 4A, 4B and 4C;

DESCRIPTION OF THE PREFERRED EMBODIMENTS

Figure 1:
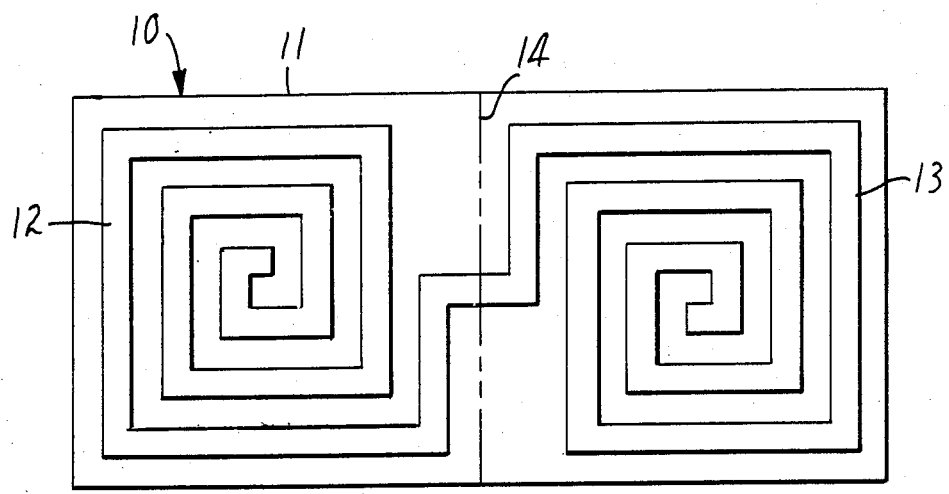
FIG. 1 is a top view of a multi-turn spiral pattern on a dielectric sheet prior to being folded to provide an inductive-capacitive tuned resonant circuit according to the present invention.

As set forth in FIG. 1, one embodiment of an inductive-capacitive tuned resonant circuit according to the present invention may be constructed from a dielectric sheet having affixed to one surface thereof a continuous conductive spiral pattern such that when the sheet is folded about a center line, two portions of the pattern become positioned opposite each other, with the dielectric sheet interposed therebetween. The combination thus forms network of distributed capacitors which together with the inductive patterns completes the tuned resonant circuit. Accordingly, as there shown, such a tuned resonant circuit 10 may include a dielectric sheet 11 having affixed to one surface thereof a double spiral conductive pattern which includes a first half 12, and connected thereto a second portion 13. The respective portions 12 and 13 oppose to each other across a fold line 14, such that when the sheet 11 is folded about that line, each leg in the portion 12 becomes substantially aligned with an opposing leg of the portion 13.

As set forth in more detail hereinbelow, it is important to the present invention that the respective legs of the opposing portions be accurately and consistently superimposed such that the distributed capacitance resulting from the opposing conductive legs of each of the spiral portions is constant. Similarly, in such a folded-over embodiment, to ensure reproducible capacitance it is essential that the two layers of the dielectric sheet 11 be uniformly bonded together when folded over such that all of the opposing conductive portions of the spirals 12 and 13 are equally spaced apart. It is, of course, recognized that other variants for providing a folded over construction may be utilized. For example, the dielectric sheet 11 containing the two spiral portions 12 and 13 may be folded such that the conductive spiral portions face each other and a separate dielectric sheet sandwiched therebetween to provide the dielectric layer in the resultant distributed capacitor thus formed. Similarly, if desired, more than two consecutive spiral portions may be formed by extending the dielectric sheet 11 and having additional spiral patterns affixed to the extended portions. The dielectric sheet would then be folded in a zigzag fashion such that the additional spiral patterns become similarly opposed to provide additional distributed capacitors.

A preferred construction of a tag such as shown in FIG. 1 may be formed of a polyethylene film approximately 0.001 inches (0.025 mm) thick having bonded to one surface thereof a spiral pattern including the portions 12 and 13 formed of aluminum foil, 0.002 inches (0.05 mm) thick. Such a spiral pattern may be formed by any of a variety of conventional techniques, such as by die-cutting the pattern into a sheet of aluminum and thereafter bonding the spiral pattern to the dielectric sheet. Similarly, a uniform aluminum sheet may be previously bonded to a dielectric sheet and the spiral pattern thereafter provided via conventional etching techniques. Conductive paints, metallized thin films, and the like may also be utilized.

While polyethylene films are particularly desirable for use as the dielectric sheet inasmuch as metallic foils such as aluminum may be readily bonded to such a dielectric, it is similarly within the scope of the present invention that numerous polymeric materials may similarly be utilized. The thickness and composition selected would thus be varied depending upon the specific capacitance desired in the resultant tuned resonant circuit.

Figure 2:
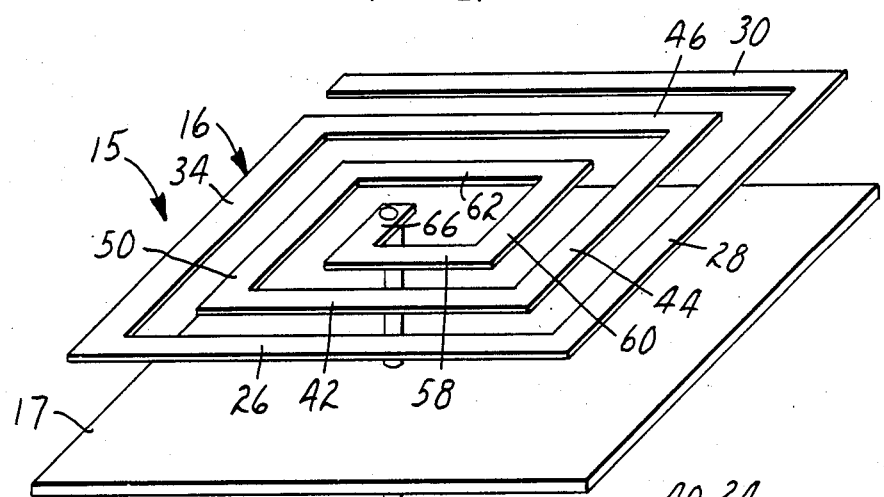
FIG. 2 is an expanded view of another embodiment of a tuned resonant circuit of the present invention in which a connection between opposing multi-turn spirals provided on opposite surfaces of a dielectric sheet results from a contact extending through the dielectric sheet.

Another preferred embodiment of a tuned resonant circuit according to the present invention is set forth in exploded view in FIG. 2. As there seen, such a circuit 15 comprises a laminate of a first metallic spiral 16, a dielectric sheet 17, second metallic spiral 18, and a conductive member 19 which extends through the dielectric sheet 17 and contacts the innermost turn of the upper and lower spirals 16 and 18. The respective spirals 16 and 18 may be prepared and bonded to the respective opposite surfaces of the dielectric sheet 17 in any of a number of conventional manners such as set forth above. However, a preferred embodiment for providing such patterns is set forth in conjunction with FIGS. 5 and 6 hereinafter. Similarly, the conductive member 19 which connects the innermost turn of the spiral members 16 and 18 may be provided in a variety of ways, such as via a metallic rivet or eyelet punched through the respective members. A preferred means for providing such a connection is set forth in conjunction with FIGS. 8 and 9 hereinafter.

The exploded view set forth in FIG. 2 enables the distributed capacitors formed by the opposing legs of each of the respective spirals 16 and 18 to be readily analyzed. Thus, for example, it may be seen that the outer legs 20, 22 and 24 of the spiral 18 in combination with the opposing legs 26, 28 and 30 of the spiral 16 form a first capacitor, such a capacitor beginning with the open-ended leg 20 and terminating at the end of open-ended leg 30. Continuing in a counterclockwise fashion, it may then be observed that a second capacitor is formed by the leg 34 of the spiral 16 in combination with leg 32 of the spiral 18, such a distributed capacitor terminating as a result of the discontinuities between the legs 32 and 20 of the spiral 18 and legs 30 and 34 of spiral 16. In like fashion, a third capacitor may be recognized as being formed by legs 36, 38 and 40 respectively of spiral 18 in combination with legs 42, 44 and 46 of spiral 16, while a fourth capacitor is formed by the combination of legs 48 and 50 of the respective spirals. Finally, it may be recognized that legs 52, 54 and 56 combine with legs 58, 60 and 62 of the respective spirals to form a fifth capacitor, while a sixth capacitor is formed from the combination of legs 64 and 66. Any of the capacitors $C_1$ through $C_6$ may be shorted out by connecting the respective opposing legs.

The embodiment set forth in FIG. 2 and other equivalent circuits is conveniently analyzed by means of FIGS. 3-5, wherein it is initially assumed that none of the respective capacitors is shorted out.

The equivalent electrical circuit for such a combination of capacitors is set forth in FIG. 3. Thus, for example, it will be recognized that all of the respective capacitors $C_1$ through $C_6$ are connected in parallel, inasmuch as all of the respective upper plates are formed of the upper spiral 16 and all of the lower plates are formed of the lower spiral 18. While the above discussion is a useful tool for analyzing the distributed capacitance formed by the continuum of the opposing respective legs of the spirals 16 and 18 as shown in FIG. 2, it must be recognized that similar combinations of the adjacent legs may be made, it being arbitrary at which point the analysis begins.

The opposing spirals 16 and 18 may also be viewed as being electrically equivalent to a succession of closed loops wherein a turn on one spiral is inductively coupled to an opposing turn in the opposite spiral by means of the distributed capacitance formed therebetween. Thus, for example, as shown in FIG. 4A, a first closed loop 68 may be seen to be formed from the outermost legs 20, 22, 24 and 32 of the spiral 18 in combination with the outermost legs 26, 28, 30 and 34 of the spiral 16. In FIGS. 4A, 4B and 4C, the respective portions of each spiral are shown to be slightly displaced and the dielectric layer omitted in the interests of clarity. In actual construction, the respective legs will be as accurately aligned as possible. As clearly shown in that Figure, the combination of the turns of the opposing legs forms a closed loop notwithstanding the respective electrical discontinuities in each spiral. Similarly, in FIG. 4B it may be seen that a second closed loop 70 is formed from legs 32, 36, 38 and 40 of the lower spiral 18 in combination with legs 34, 42, 44 and 46 of the upper spiral 16, such legs again being shown in slightly offset fashion and the dielectric layer sandwiched therebetween omitted for purposes of clarity. Finally, a third closed loop 72 is shown in FIG. 4C to be formed of three of the same legs of each spiral shown in FIG. 4B to form the second loop, but wherein the three legs are combined with an inner leg not previously utilized. Thus such a loop is formed of legs 36, 38, 40 and 48 of spiral 18 in combination with legs 42, 44, 46 and 50 of the spiral 16. A similar analysis may be carried forth on the remaining portions of the two respective spirals 16 and 18 so as to complete two additional closed loops. It may thus be seen that the legs forming the first closed loop ($L_1$) shown in FIG. 4A, are the same as those which were seen to form capacitors $C_1$ and $C_2$ as set forth in FIG. 3. Similarly, the legs used to form the second loop ($L_2$) are the same as formed capacitors $C_2$ and $C_3$ in FIG. 3 while the legs used to form the third closed loop ($L_3$) are those which also form capacitors $C_3$ and $C_4$. Analogously, the legs forming a fourth closed loop ($L_4$) are those which form capacitors $C_4$ and $C_5$ and the legs forming the fifth loop ($L_5$) are those which form capacitors $C_5$ and $C_6$.

A complete electrical equivalent diagram thus formed by the combination of the six capacitors and five closed loops explained hereinabove is set forth in FIG. 5. As there shown, the first closed loop ($L_1$) may be seen to be connected in series with capacitors $C_1$ and $C_2$, while the second loop ($L_2$) is connected in series with capacitors $C_2$ and $C_3$, loop ($L_3$) is connected in series with capacitors $C_3$ and $C_4$, loop ($L_4$) is connected in series with capacitors $C_4$ and $C_5$ and the final loop ($L_5$) is connected in series with capacitors $C_5$ and $C_6$. Three complete turns are thus provided in each spiral portion, and a total of 2N or six capacitors and 2N−1, or five inductors are thus formed.

In an analysis of the interaction between such distributed capacitors and the respective inductors, the total charge on the upper side of any given capacitor j may be defined as $Q_j$. An equal and opposite charge ($-Q_j$) resides on the opposing side of any given capacitor. In such an analysis, it is convenient to assume that the total charge $Q_j$ for each capacitor is uniformly distributed thereon, which condition is satisfied if edge effects are small and the potential drop due to resistive losses along each capacitor is small compared to the EMF induced across each capacitor. Both such conditions are readily met in the preferred embodiments of the present invention wherein each of the legs of the respective spirals 16 and 18 has a substantially rectangular cross-section, the width of which is significantly greater than the thickness of the dielectric layer. The capacitance of each capacitor $C_j$ may be defined as by the relationship: $C_j = K\epsilon_o A_j/\delta$, where K is the dielectric constant of the dielectric sheet, $\epsilon_o$ is the permittivity of free space, $A_j$ is the area of the capacitor; and $\delta$ is the thickness of the dielectric layer.

Due to the continuous nature of each of the spiral portions, it will be recognized that the current induced into the circuit varies continuously along any given capacitor, and equals $I_{j-1}$ at the outer end of a given capacitor j, and $I_j$ at the inner end capacitor j. Conservation of charge requires that the current on each spiral varies linearly with position, and that the sum of the currents on opposite sides of each capacitor j at an arbitrary point satisfies the relation: I(lower portion)+I(upper portion)=$I_{j-1}+I_j$, independent of position. Since the dielectric layer thickness is small compared to the width of each spiral leg and the distance between adjacent spiral legs, the current on each capacitor j can be represented as a single line element of current equal to $I_{j-1}+I_j$. Thus the inductance can be represented as a matrix of inductance loops, there being a total of 2N−1 such loops, which possess both self and mutual inductance as given by Neuman's formula:

$$M_{nm} = \left(\frac{\mu_o}{4\pi}\right) \S\S(\vec{ds_n} \cdot \vec{ds_m})r_{nm}^{-1},$$

where $\mu_o$ is the permeability in free space, $ds_n$ and $ds_m$ are incremental line elements along each loop and $r_{nm}$ is the distance between the two increments $ds_n$ and $ds_m$.

FIG. 5 may thus be viewed as a combination of five coupled resonant circuits which would resonant at five frequencies if they could be uncoupled. Because of the inherent coupling, analysis shows that the combined circuits are still capable of resonating at a number of distinct frequencies, 2N−1, such as 5 as in the embodiments shown in FIGS. 2-5. The lowest of these frequencies may be referred to as the fundamental. At the fundamental frequency, the circuit resonates with only current nodes at the inner and outer termini and a single current antinode therebetween. The next higher order resonant mode exhibits two current antinodes, the third higher order, 3 antinodes, etc. The resonant frequencies associated with the higher order modes are generally not integral multiples of the fundamental frequency as the capacitance and inductance associated with each turn of decreasing area will be different.

A marker containing an LC circuit such as just described wherein a number of distinct resonant frequencies are present is useful in a variety of types of electronic article surveillance systems one such type being set forth in the patents of Lichtblau referenced hereinabove. A preferred system utilizing the multi-resonant properties would include a transmitter for producing a radio frequency electromagnetic field periodically varying at at least two predetermined frequencies, and a receiver for responding to signals resulting from the interaction of the LC circuit with the field. In one version, such a receiver would include means such as a plurality of filter circuits or the like, so as to detect the presence of signals at at least two of the resonant frequencies. As the intensities of marker produced signals corresponding to the various resonant frequencies may be considerably different, that of the fundamental frequency typically being many times more intense than that provided by the higher order resonances, such a system may also include additional circuits for establishing different threshold levels for each of the respective wave lengths, thereby allowing an alarm signal to be produced only when the received signal at each respective wave length has an appropriate magnitude.

Figure 10:
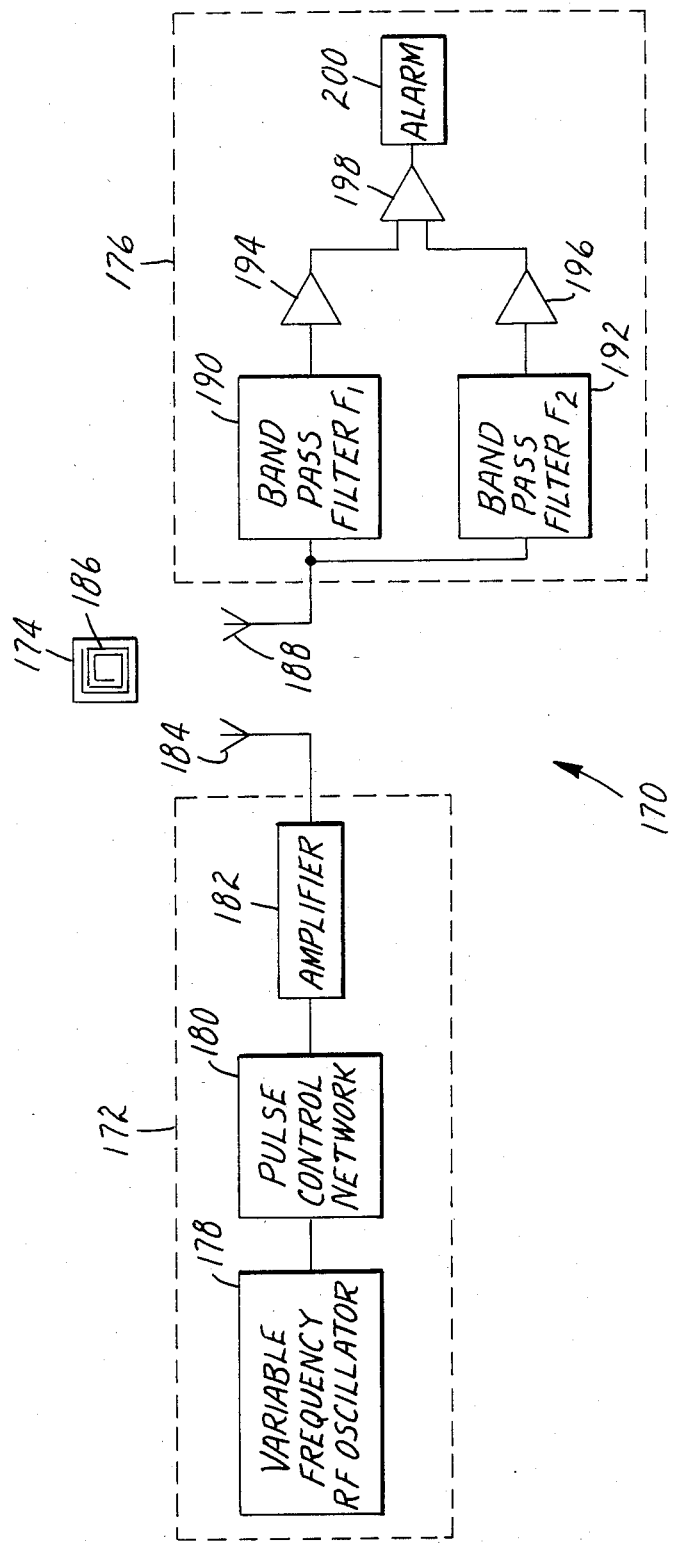
FIG. 10 is a block diagram of an electronic article surveillance system comprising a marker containing a circuit according to the present invention.

FIG. 10 sets forth a block diagram of such a preferred system. As there set forth, the system includes a transmitter 172, a marker 174, such as described above, and a receiver 176. Within the transmitter 172, will be provided an oscillator 178 for generating radio frequency signals at at least two of the frequencies at which the marker 174 resonates. In a preferred embodiment, such an oscillator will comprise a voltage controlled oscillator and a switchable power supply to provide a succession of discrete voltages to the oscillator, thereby generating a succession of signals at different RF frequencies. These signals at the different frequencies are then coupled to a pulse control network 180, which under the control of a time control generator will create bursts of radio frequency energy at each of the discrete different frequencies, each burst being separated from the previous or succeeding burst by a quiescent period. The succession of bursts as provided by the network 180 at the various frequencies is then coupled through an RF amplifier 182 to a transmitting antenna 184. Accordingly, there is provided within an interrogation zone, typically defined by pedestals within which are positioned the transmitter and receiver 172 and 176 respectively, radio frequency electromagnetic field which periodically varies at at least two frequencies corresponding to the resonant frequencies of a circuit 186 within the tag 174. When those frequencies are accordingly excited, energy at those frequencies will be absorbed within the circuit 186 and the absorbed energy thereafter will cause the circuit 186 to oscillate at least those frequencies. The oscillations are manifested as a decayed oscillating signal which persists during the previously mentioned quiescent period.

The receiver 176 may further be seen in FIG. 10 to include an antenna 188 for receiving signals during the quiescent period from the circuit 186. The received signals are coupled from the antenna 188 to at least a pair of band pass filters 190 and 192, each of which has a center frequency $F_1$ and $F_2$ at one of the resonant frequencies of the circuit 186. Signals received and having the appropriate frequency to pass through one of the band pass filters 190 and 192 will thereafter be coupled to one of the tuned amplifiers 194 or 196. The outputs from the two amplifiers is coupled to a differential amplifier 198, thereby providing an output in the event the signals from each of the amplifiers 194 and 196 exceed a given level. Such an output signal is coupled to an alarm circuit 200, to produce an alarm signal in the event signals above a predetermined threshold condition at each of the frequencies $F_1$ and $F_2$ have been detected.

While such a system is preferred in order to detect such a multiple-resonant marker, it is well within the state of the art of electronic article surveillance systems to effect such detection by a variety of other analogous ways. Thus, for example, a transmitter section may provide a series of bursts of radio frequency energy within which the frequency is continuously varied during each burst so as to provide a sweep of frequencies extending over the range of frequencies within which the marker is resonant. In such a system, there would typically not be a quiescent period between each burst, and the circuit within the marker would simply absorb energy within the range of the swept frequencies at the respective resonant frequencies. The receiver circuit would then be adapted to detect the absorption of energy at the given frequencies.

It is similarly known in the prior art to provide appropriate timing signals such that the receiver may be activated only during appropriate time intervals such as during the quiescent period following bursts of transmitted energy, and to provide successive signal and noise windows to further discriminate against noise and other inadvertent or intermittent electromagnetic interference. It is also known in the prior art to utilize tansmitters which simultaneously provide energy at two frequencies, $F_1$ and $F_2$ within an interrogation zone, which energy is typically absorbed by a non-linear element within a marker to create sum and difference frequencies ($F_1+F_2$ and $F_1-F_2$) which are thereafter detected. Analogously, another system using the multiple-resonant, distributed-capacitance circuit of the present invention would utilize simultaneously produced fields at the different frequencies at which the circuit is resonant, and would provide a receiver within which signals resulting from the circuit are mixed to form the sum or difference frequencies. The presence of the sum or difference frequencies could then be detected by appropriate band pass filters, threshold detectors and the like. Similar known techniques to improve the reliability of the overall system may also be used. The inclusion of any such features is considered to be within the scope of the present invention.

In a further preferred embodiment, the tuned resonant circuit of the present invention may be made by means of successive die-cutting operations such as set forth in U.S. patent application Ser. Nos. 256,924, filed April 23, 1981 by W. C. Tait and L. L. Harklau and 385,008, filed June 4, 1982 by R. W. Rubertus and W. C. Tait. A LC circuit formed by such a process is set forth in exploded view in FIG. 6. As may there be seen, such a circuit 74 includes a top conductive spiral 76, a bottom conductive spiral 78 and sandwiched therebetween two dielectric layers 80 and 82. The upper and lower conductive spirals 76 and 78 respectively are in turn electrically connected together by means of an electrically contacting member 84 which extends through the respective dielectric sheets 80 and 82 and is connected to a first leg of 86 and 88 respectively of the spirals 76 and 78. These legs are somewhat wider than the remaining legs to facilitate the electrical connection. The respective dielectric sheets 80 and 82 are shown to have a series of elongated openings generally aligned with the spaces between the adjacent legs of the respective spirals 76 and 78, which openings result from successive die-cutting operations utilized in forming the conductive spirals 76 and 78 as described hereinafter.

Figure 6:
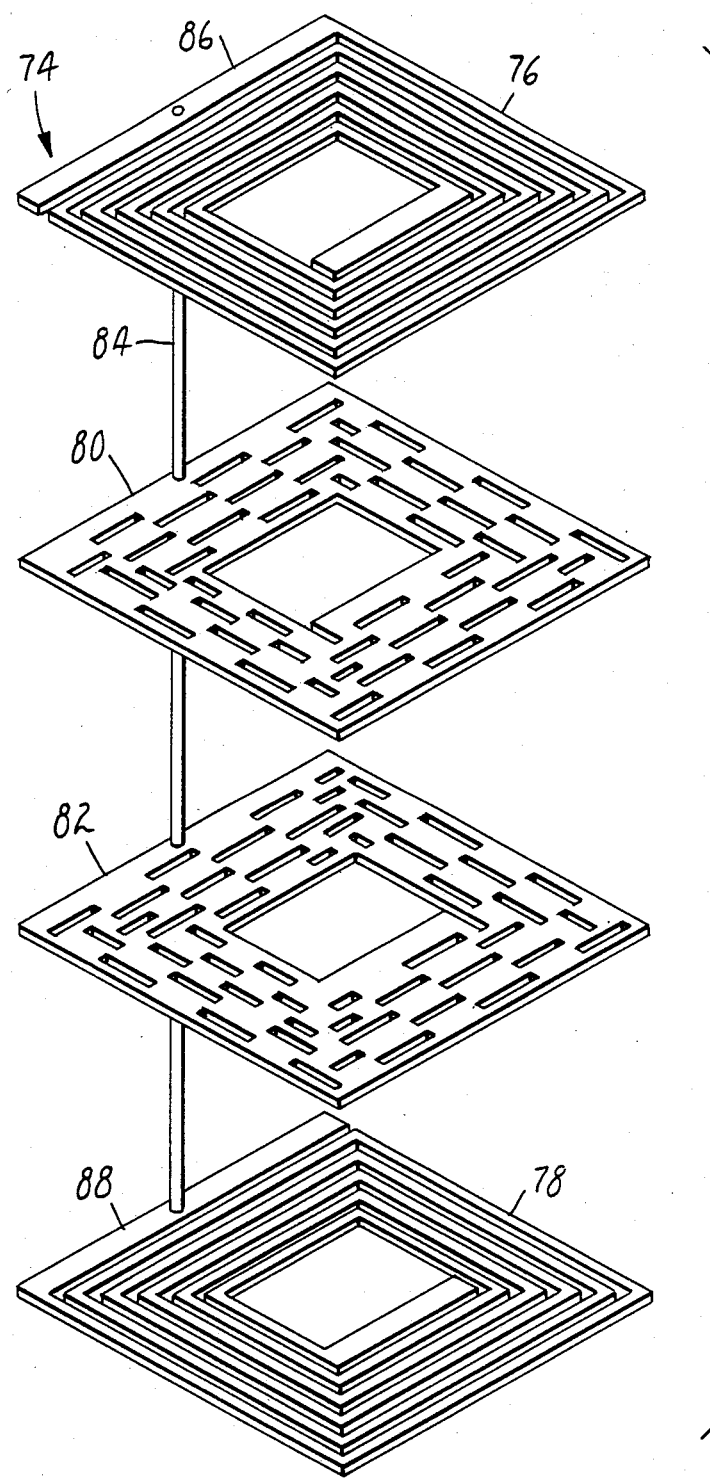
FIG. 6 is an exploded perspective view of another preferred embodiment of the present invention.
Figure 7A:
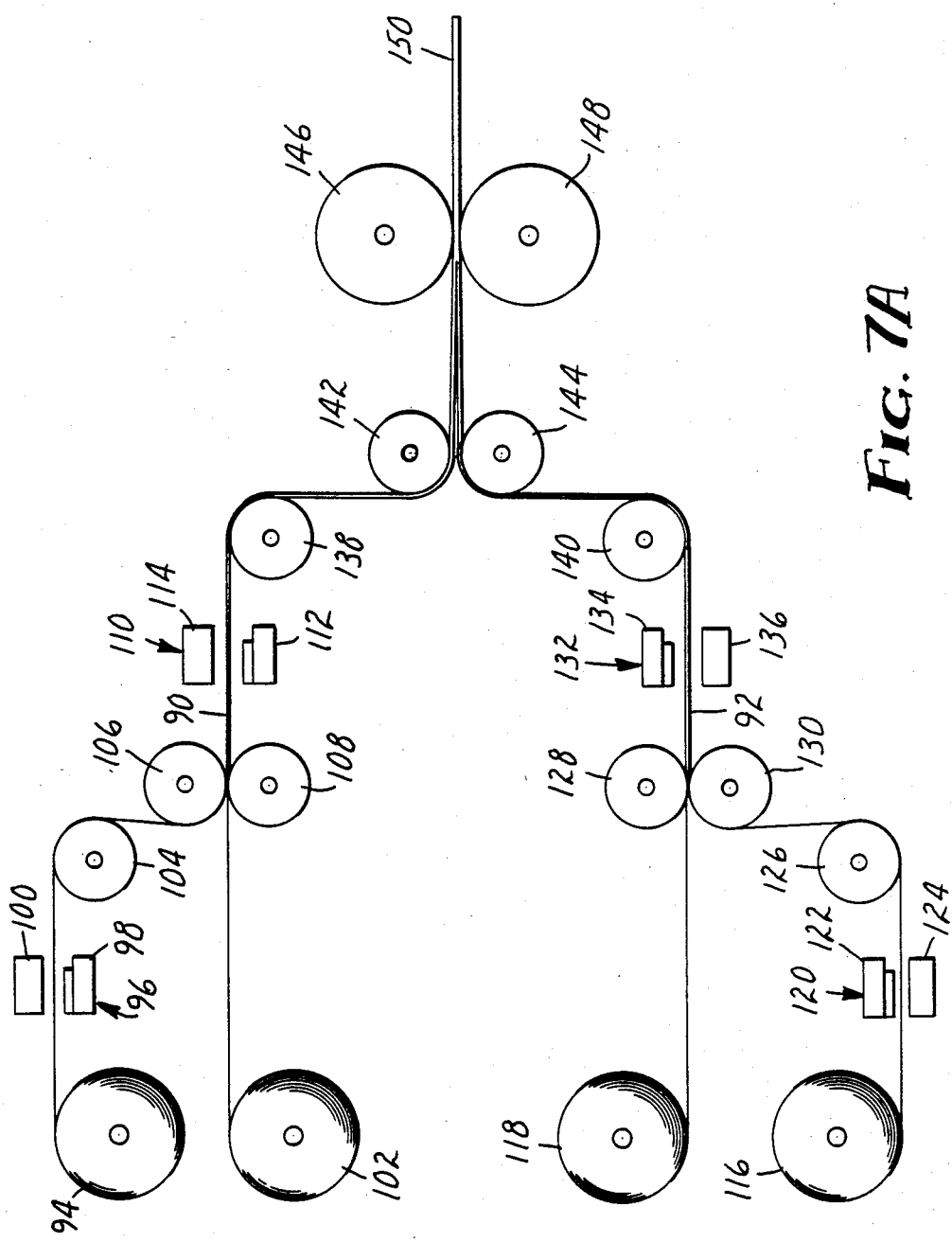
FIGS. 7A and 7B are cross-sectional views of a preferred process for producing the circuit shown in FIG. 6.

A preferred method of manufacturing an LC circuit such as that shown in FIG. 6 is generally illustrated in FIG. 7, and is, in many respects, similar to the method disclosed and claimed in U.S. patent application Ser. No. 385,008 filed June 4, 1982 by R. W. Rubertus and W. C. Tait. As shown in FIG. 7, the method involves the simple and conventional operations of die-cutting and laminating, which method is adaptable to the automated manufacture of LC networks and is therefore capable of achieving a significant reduction in the cost of such networks relative to prior art methods. The method according to the present invention utilizes conventional die-cutting presses with associated male and female punch and die assemblies, together with conventional laminating means. As set forth in the left hand portion of FIG. 7A, the first stage in the method involves the formation of two separate pre-laminates 90 and 92, respectively, each of which comprises a metal sheet together with a dielectric sheet. Thus, in forming the first pre-laminate 90, there is provided a roll of a metal sheet, such as a roll of aluminum foil 94. Similar conductive materials, such as copper, having a range of thicknesses varying from 0.02 millimeters to 0.10 millimeters may also be utilized. The aluminum roll is then passed through a die-cutting station 96, which includes a male punch member 98 and a female die member 100. The punch and die have a pattern such that upon application to the aluminum sheet, there is removed from the aluminum sheet a predetermined discontinuous pattern, leaving behind a conductive path having an essentially coil-like configuration containing a plurality of windings with a plurality of interconnections between the adjacent windings wherein the conductive sheet remains intact. It will be recognized that with the punch member 98 of the punch and die assembly 96, directed to the under surface of the aluminum sheet, burrs resulting from the punching operation will be caused to project from the upper surface of the aluminum sheet.

The second layer of the pre-laminate 90 is formed from a roll of dielectric material such as a roll of polyethylene 102. It will be appreciated that a large variety of various dielectric materials may similarly be utilized, such as electrical grade paper and other polymeric compositions typically utilized in electrical or capacitor applications. Where a roll of polyethylene is utilized, it may be desired to provide a primed top surface, such as by corona treatment, to enhance the adherence of the polyethylene sheet to the aluminum sheet as described hereinafter. The aluminum and polyethylene rolls 94 and 102, respectively, are thence brought together via guide roller 104 and passed between heated pressure rollers 106 and 108, thus forming the first pre-laminate 90.

The pre-laminate 90 is then passed through a second die cutting station 114, which station includes a second punch member 112 and an associated die 114. The second cutting operation eliminates the interconnections between the conductive paths previously cut in the aluminum sheet during the first cutting operation at the station 96 and thus completes a multi-turn inductor. On the other hand, the dielectric sheet 102 is left with a plurality of discontinuous elongated apertures corresponding to the removed interconnections in the aluminum sheet while remaining intact in areas corresponding to the portions removed from the aluminum sheet during the first cutting operation, and thus has appreciable structural integrity to provide rigidity to the finally formed pre-laminate. The resultant patterns in the aluminum and dielectric sheets correspond to the multi-turn spiral and dielectric sheet, 76 and 80 respectively, shown in FIG. 6.

As further shown in FIG. 7A, a second pre-laminate is similarly formed from a roll of metal foil 116, such as a roll of aluminum, and a roll of dielectric material 118, such as a corona treated roll of polyethylene. In like manner to that discussed above, the aluminum roll 116 is first passed by a die-cutting station 120 which includes a male punch member 122 and matching die 124, the operation of which removes a discontinuous predetermined pattern from the aluminum sheet and thus forms another multi-turn, essentially spiral-like configuration, having a plurality of interconnecting regions between adjacent turns of the spiral-like configuration. Similarly, the male punch member 122 being punched through the aluminum sheet 116 into the female die member 124 will cause burrs to protrude from the lower surface of the aluminum sheet.

Again, in like manner to the formation of the first pre-laminate 90, the aluminum sheet 116 is then directed around a guide roller 126 and is laminated to the polyethylene sheet 118 by means of heated pressure rollers 128 and 130. The resulting pre-laminate 92 is passed through a second die-cutting station 132 made up of a male punch member 134 and a corresponding female die member 136. The operation of the second punching assembly 132 removes from the pre-laminate 92 another discontinuous predetermined pattern which includes the interconnecting regions between the adjacent turns formed in the aluminum sheet 116 during the operation of the first die-cutting station 120, and thus leaves within the aluminum sheet 116 of the pre-laminate 92 at least one continuous portion of the spiral-like configuration with no interconnecting regions thereby completing another multi-turn inductor. In both the pre-laminates 90 and 92, burrs resulting during the operation of the second die-cutting stations 110 and 132 extend through the outward facing surfaces of the aluminum sheets. As with the pre-laminate 90, while a continuous spiral-like path results in the aluminum sheet 116, the dielectric sheet 118 is left with a plurality of discontinuous elongated apertures corresponding to the removed interconnections in the aluminum sheet 116, while remaining intact in areas corresponding to the portions removed from the aluminum sheet during the operation of the first die-cutting station 120, and thus has appreciable structural integrity to provide rigidity to the finally formed pre-laminate 50.

In the next stage of the method, the two pre-laminates are directed around guide rollers, such as rollers 138, 140, 142 and 144, and are thence directed through heated pressure rollers 146 and 148 to fuse the dielectric layers together, thereby forming a three layer laminate 150 which includes an inductive-capacitive (LC) network including the two multi-turn inductors formed as an integral part of each of the pre-laminates, together with a capacitor formed as the result of the homogeneously fused together dielectric layer 151 being sandwiched between the multi-turn inductors, but with there being no direct electrical connection between the inductors. Such a connection may then be provided, such as by member 84 shown in FIG. 6, via conventional rivets, conductive paint applied through an appropriately positioned hole, or the like.

Figure 7B:
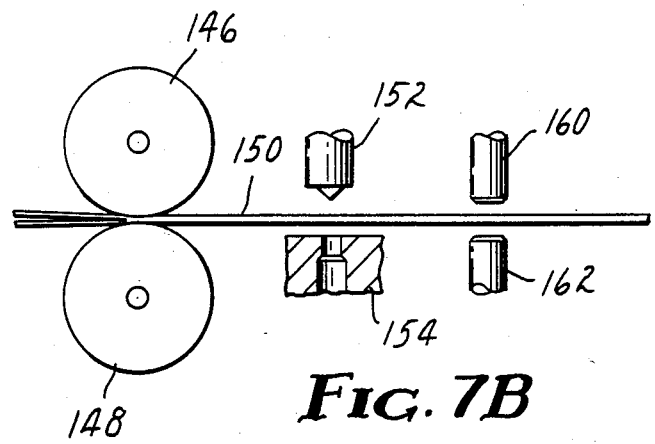
Figure 8:
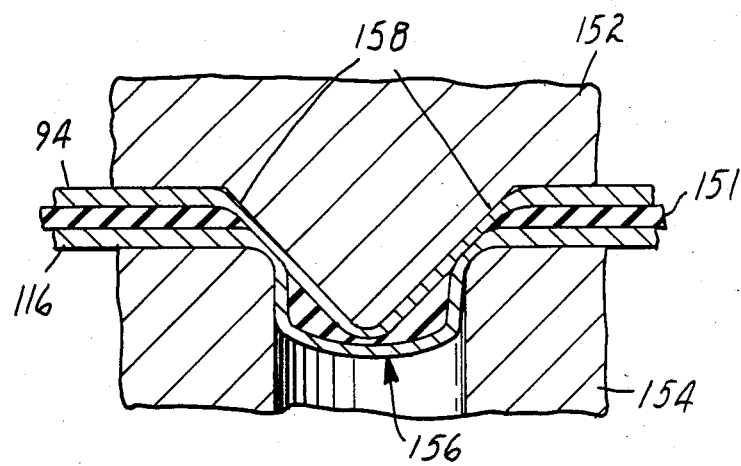
FIGS. 8 and 9 are cross-sections of a preferred circuit resulting at two latter stages shown in FIG. 7B.
Figure 9:
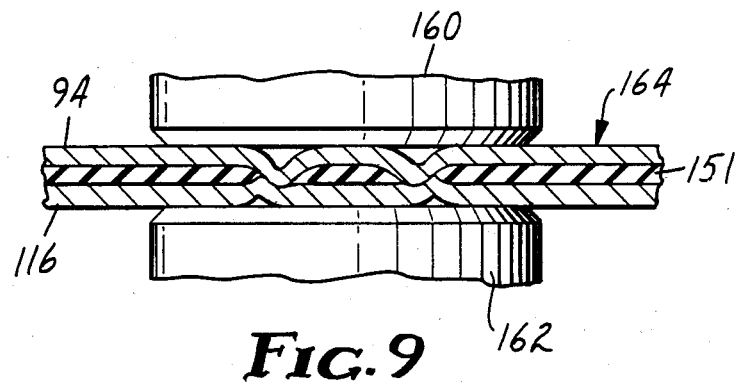

A preferred method of providing such a connection is shown in FIGS. 7B, 8 and 9, which method is the invention of Philip W. O'Brien and is disclosed and claimed in a companion patent application, U.S. Ser. No. 552,306, filed Nov. 16, 1983. According to such a method, after the laminate 150 is formed, such as via the pressure rollers 146 and 148, a conically shaped punch 152, aligned with a die 154 having a round opening, is applied to a selected, desirably enlarged portion of the multi-turn spiral (portions 86 and 88 as shown in FIG. 6). As shown in detail in the cross-sectional view of FIG. 8, the punch action causes an extrusion 156 to form in the die cavity, with the laminated dielectric layer 151 being sheared and metal to metal contact being made between the aluminum sheets 94 and 116 at the periphery 158 of the extrusion. The extrusion is then forced back into the laminate via opposing flat faced punches 160 and 162 to form a plug and a permanent electrical contact, as shown in detail in the cross-sectional view of FIG. 9. This punching operation compresses the extrusion, and results in a low-resistance connection across the shear line at the periphery 158, while leaving the final laminate 164 substantially planar, with no protrusions or bumps. Typically, connections having resistances of only a few tenths of an ohm have been thus reproducibly formed. The final formed laminate 164 is then coupled to a converter (not shown) within which, for example, the individual LC circuits may be partially die-cut and/or assembled on a carrier liner for ready use by the ultimate consumer.

In a preferred example, such as shown in FIG. 6, a polyethylene film 0.0018 inch (0.045 mm) thick, formed of two 0.0009 inch (0.022 mm) sheets fused together, was laminated between aluminum sheets formed into 5¾ turn inductor spirals, the overall dimension of which was about five by five cm. The outermost legs 86 and 88 and the innermost legs has a width of 2.5 mm, while the remaining legs had a width of about 1 mm, with a spacing between adjacent legs of about 0.75 mm.

As shown in the following table, a resonant frequency of 7.98 MHz resulted when the respective inductors are unshorted. The table details the resultant resonant frequencies and Q-factors which resulted when the respective legs forming a consecutive capacitor, as analyzed in conjunction with FIGS. 2 and 3, were sequentially shorted out. Thus a first capacitor segment (n=1) corresponds to the outermost legs 86 and 82. A second capacitor segment (n=2) corresponds to the remaining three legs of the outermost turn, etc. In the table, f is the resonant frequency (MHz), Q is the Q-factor, and n is the equivalent capacitor segment which was shorted out, beginning with the outermost legs 86 and 88, n being equal to zero when no short was present.

TABLE

| n | f | Q |
| --- | --- | --- |
| 0 | 7.98 | 107 |
| 1 | 4.65 | 69 |
| 2 | 5.38 | 85 |
| 3 | 6.18 | 78 |
| 4 | 7.14 | 91 |
| 5 | 7.87 | 110 |
| 6 | 7.92 | 104 |
| 7 | 7.21 | 90 |
| 8 | 6.40 | 78 |
| 9 | 5.63 | 76 |
| 10 | 5.05 | 80 |

TABLE-continued

| n | f | Q |
| --- | --- | --- |
| 11 | 4.54 | 81 |
| 12 | 4.22 | 83 |

While the dielectric materials discussed hereinabove have primarily been suggested to be formed of corona treated polyethylene webs, similar dielectric materials typically utilized for capacitor dielectrics may be formed from webs of polypropylene having thicknesses in the range from 0.02 to 0.1 millimeter. Other non-conductive materials having requisite dielectric characteristics may be similarly utilized. Depending upon the capacitance desired in the ultimate laminate, the thickness of the dielectric sheets utilized in the present invention may typically be in the range of 1 to 4 mils (25-100 micrometers). Corona treated rolls of polyethylene are preferably provided as a coating on an underlying sheet of polyester. The polyester sheet may be removed prior to the second stamping operation. However, in order to provide a harder surface to improve the shearing action, during the second stamping operation, the polyester sheet may be desirably initially retained and only be removed after the second stamping operation is completed. Depending upon the resonant frequency or Q-factor required for the LC networks, other sheet thicknesses and materials having varying dielectric constants may similarly be utilized. Also, various metallic sheets may be utilized. While aluminum and copper foils may be preferred, both because of the high conductivities and low cost provided thereby, other formulations affording greater ease in punching, flexibility, or the like may similarly be desired.

It has been found that the fundamental resonant frequency varies directly with the square root of dielectric layer thickness and the square root of registration mismatch. The Q-factor varies directly with the thickness of the metal foil, provided the metal thickness is smaller than the skin depth.

Having thus described the preferred embodiments of methods of making the substantially planar LC networks of the present invention and of the networks per se, it will be understood that changes may be made in the size, shape or configuration of the parts of circuits described herein without departing from the present invention as recited in the claims.

I claim:

1. An electronic article surveillance system comprising a transmitter for transmitting radio frequency energy at at least two predetermined frequencies,
a marker containing a circuit comprising a dielectric sheet having on each surface thereof a conductive multi-turn spiral each turn of which forms a substantially closed loop and is in substantial registration with an opposing turn of the spiral on the opposite surface, each of the multi-turn spirals being oppositely wound with respect to each other when both are viewed from the same side of the sheet to thereby form a series of closed loops having both inductive and distributed capacitive components which in combination resonate at at least said two predetermined frequencies, and
a receiver for receiving signals resulting from the circuit resonating at said two predetermined frequencies and for creating an output signal in response to the receipt of said resultant signals.

2. A marker for use in an electronic article surveillance system having a transmitter for producing a radio frequency electromagnetic field periodically varying at at least two predetermined frequencies, and a receiver for receiving signals resulting from the interaction of the marker with the field, and for creating an output signal in response to the receipt of said resultant signals, wherein said marker contains a circuit comprising a dielectric sheet having on each surface thereof a conductive multi-turn spiral each turn of which forms a substantially closed loop and is in substantial registration with an opposing turn of the spiral on the opposite surface, each of the multi-turn spirals being oppositely wound with respect to each other when both are viewed from the same side of the sheet to thereby form a series of closed loops having both inductive and distributed capacitive components which in combination resonate at at least said two predetermined frequencies upon absorption of energy from said field at said frequencies.

* * * * *